United States Patent
Guarnieri (10) Patent No.: US 9,785,856 B2
(45) Date of Patent: Oct. 10, 2017

(54) REPAIRING HOLES IN IMAGES

(71) Applicant: Konica Minolta Laboratory U.S.A., Inc., San Mateo, CA (US)

(72) Inventor: Stuart Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/056,687

(22) Filed: Feb. 29, 2016

(65) Prior Publication Data

US 2017/0249525 A1 Aug. 31, 2017

(51) Int. Cl.
*G06K 9/34* (2006.01)
*G06T 7/00* (2017.01)

(52) U.S. Cl.
CPC .............. *G06K 9/34* (2013.01); *G06T 7/0081* (2013.01); *G06T 7/0087* (2013.01); *G06K 2209/01* (2013.01); *G06T 2207/20104* (2013.01)

(58) Field of Classification Search
USPC ....... 382/178, 283, 225; 257/59, 72; 349/43; 359/381, 818; 356/432, 433, 441; 707/706, 722
See application file for complete search history.

(56) References Cited

U.S. PATENT DOCUMENTS

| | | | | |
|---|---|---|---|---|
| 5,745,308 | A | * | 4/1998 | Spangenberg ..... G01N 15/1436 359/381 |
| 5,844,685 | A | * | 12/1998 | Gontin .............. G01N 15/1436 356/432 |
| 8,879,796 | B2 | | 11/2014 | Rodriguez Serrano |
| 8,917,910 | B2 | | 12/2014 | Rodriguez Serrano |
| 8,917,935 | B2 | | 12/2014 | Epshtein et al. |
| 9,218,661 | B2 | * | 12/2015 | Gazit ..................... A61B 5/055 |
| 9,471,912 | B2 | * | 10/2016 | Verkasalo ............ G06Q 20/322 |
| 9,536,321 | B2 | * | 1/2017 | Ho .......................... G06T 7/408 |

OTHER PUBLICATIONS

Boris Epshtein et al., "Detecting Text in Natural Scenes With Stroke Width Transform", 2010 IEEE Conference on Computer Vision and Pattern Recognition (CVPR), pp. 2963-2970, Jun. 2010 (8 pages).

* cited by examiner

*Primary Examiner* — Anh H Do
(74) *Attorney, Agent, or Firm* — Osha Liang LLP (57) ABSTRACT

A method for image processing that includes: obtaining a mask of a connected component (CC) from an image; generating a stroke width transform (SWT) image based on the mask; calculating multiple stroke width parameters for the mask based on the SWT image; identifying a hole in the CC of the mask; calculating a stroke width estimate for the hole based on the stroke width values of pixels in the SWT image surrounding the hole; generating a comparison of the stroke width estimate for the hole with a limit based on the multiple stroke width parameters for the mask; and generating a revised mask by filling the hole in response to the comparison.

20 Claims, 6 Drawing Sheets

REPAIRING HOLES IN IMAGES

BACKGROUND

Writing boards (e.g., whiteboards, blackboards, etc.) are frequently used in many different settings (e.g., academic, corporate, non-profit, residential, etc.). Text, drawings, charts, graphs, etc. may be placed on writing boards to communicate ideas during lectures, training, brainstorming sessions, etc. In order to electronically memorialize these ideas, a photograph of the writing board may be taken and image processing (e.g., optical character recognition (OCR), stroke recognition, reconstruction, etc.) may be executed to extract the contents of the writing board from the image.

In an image that includes the writing board, the pen strokes on the writing board often have irregular sections that arise from a worn pen tip, irregular ink distribution, low ink, etc. These irregular sections often appear as light, faded, or missing sections within the boundaries of the pen strokes. When a mask of the image is generated, the irregular sections may appear as holes within the mask. Much of the image processing is made easier using clean, solid areas in the mask with few or no holes. In order to increase the accuracy of stroke analysis, these holes should be repaired.

SUMMARY

In general, in one aspect, the invention relates to a method for image processing. The method comprises: obtaining a mask of a connected component (CC) from an image; generating a first stroke width transform (SWT) image based on the mask; calculating a plurality of stroke width parameters for the mask based on the first SWT image; identifying a first hole in the CC of the mask; calculating a stroke width estimate for the first hole based on a plurality of stroke width values of a plurality of pixels in the first SWT image surrounding the first hole; generating a first comparison of the stroke width estimate for the first hole with a limit based on the plurality of stroke width parameters for the mask; and generating a revised mask by filling the first hole in response to the first comparison.

In general, in one aspect, the invention relates to a non-transitory computer readable medium (CRM) storing computer readable program code embodied therein. The code: obtains a mask of a connected component (CC) from an image; generates a first stroke width transform (SWT) image based on the mask; calculates a plurality of stroke width parameters for the mask based on the first SWT image; identifies a first hole in the CC of the mask; calculates a stroke width estimate for the first hole based on a plurality of stroke width values of a plurality of pixels in the first SWT image surrounding the first hole; generates a first comparison of the stroke width estimate for the first hole with a limit based on the plurality of stroke width parameters for the mask; and generates a revised mask by filling the first hole in response to the first comparison.

In general, in one aspect, the invention relates to a system for image processing. The system comprises: a buffer storing a mask of a connected component (CC) from an image; a hole identification engine that identifies a first hole in the CC of the mask; a stroke width engine that: generates a first stroke width transform (SWT) image based on the mask; calculates a plurality of stroke width parameters for the mask based on the first SWT image; and calculates a stroke width estimate for the first hole based on a plurality of stroke width values of a plurality of pixels in the first SWT image surrounding the first hole; and a filling engine that: generates a first comparison of the stroke width estimate for the first hole with a limit based on the plurality of stroke width parameters for the mask; and generates a revised mask by filling the first hole in response to the first comparison.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. Initially, a mask of one or more connected components in an image may be obtained. Each connected component may correspond to a continuous pen marking on a writing board within the image. Examples of connected components include the perimeter of a shape on the writing board, a portion of a text character on the writing board, an entire text character on the writing board, an entire word on the writing board, etc. A stroke width transform (SWT) image may be generated for the mask and one or more stroke width parameters may be calculated based on the SWT image. Holes within a connected component are identified and stroke width estimates for the holes are calculated. The criteria to fill a hole in the mask (i.e., remove the hole) is based on the size (e.g., area) of the hole, the stroke width estimate for the hole, and the stroke width parameters for the mask. The SWT image, and thus the stroke width parameters calculated based on the SWT image, may be updated after a hole in the mask has been filled.

Figure 1:
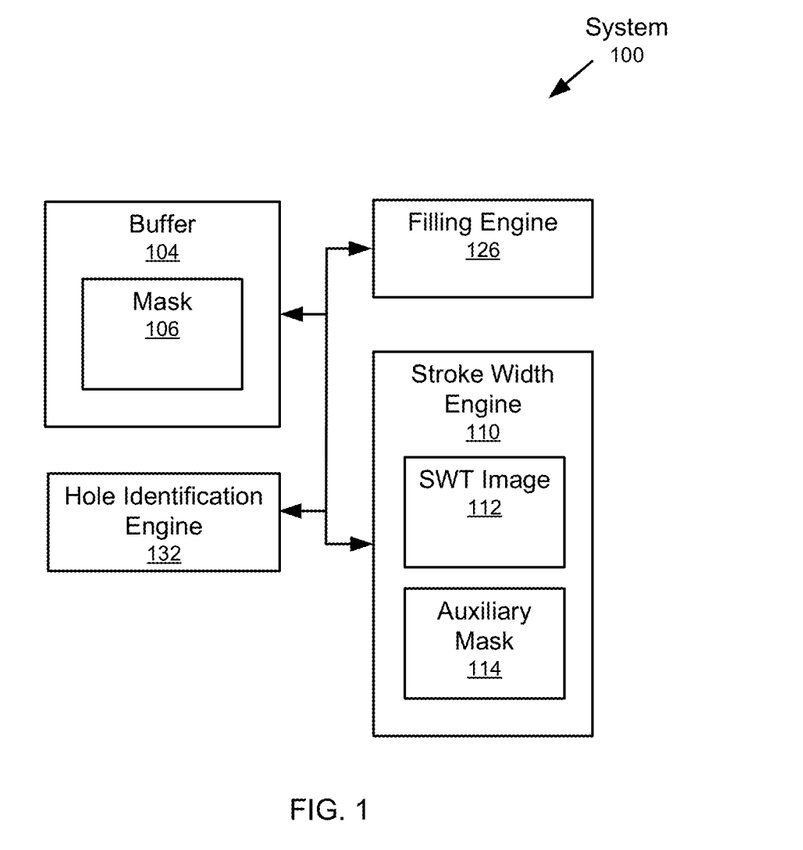
FIG. 1 shows a system in accordance with one or more embodiments of the invention.

FIG. 1 shows a system (100) in accordance with one or more embodiments of the invention. As shown in FIG. 1, the system (100) has multiple components including a buffer (104), a stroke width engine (110), a filling engine (126), and a hole identification engine (132). Each of these components (104, 110, 126, 132) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (104). The buffer (104) may be implemented in hardware (i.e., circuitry), software, or any combination thereof. The buffer (104) may be of any size or type (e.g., memory, hard drive, etc.). The buffer (104) stores a mask (106) of one or more connected components from an image.

As discussed above, the image may include a writing board and each connected component corresponds to a continuous pen marking on the writing board. The mask (106) may be considered a binary image that is generated by applying a thresholding operation to the image capturing the writing board. As a result of the thresholding operation, the irregular sections of the connected components appear as holes. The connected components may be represented using black pixels in the mask (106), while everything else in the mask (106), including the holes, is represented using white pixels. The mask (106) may correspond to all or only a portion of the image. The mask (106) may be obtained (e.g., downloaded) from any source. Further, the mask (106) may be of any size and in any format.

In one or more embodiments of the invention, the system (100) includes the hole identification engine (132). The hole identification engine (132) may be implemented in hardware (i.e., circuitry), software, or any combination thereof. The hole identification engine (132) may identify one or more holes in each connected component of the mask (106). The hole identification engine (132) may identify the holes in the mask (106) by applying various contour detection algorithms and/or edge detection algorithms to the mask (106).

In one or more embodiments of the invention, the hole identification engine (132) calculates the area (e.g., in pixels) of each connected component and the area (e.g., in pixels) of each hole. The hole identification engine (132) may also calculate, for each hole, a ratio of the area of the hole to the area of the entire connected component in which the hole is located. If the ratio exceeds a threshold area ratio (e.g., 0.1), the hole may deemed essential to understanding the connected component. Such holes should not be filled (i.e., removed). For example, the hole in the center of the digit "0" is essential to understanding the connected component. Similarly, the two holes in the text character "B" are essential to understanding the connected component. The threshold area ratio may be set by a user or a manufacturer. The hole identification engine (132) may generate and distribute a data structure (e.g., list) of all identified holes that are candidates for removal (i.e., filling). Deliberately excluded from the data structure are the holes deemed essential to understanding the connected component. Accordingly, the hole identification engine (132) effectively keeps these excluded holes unfilled.

In one or more embodiments of the invention, the system (100) includes the stroke width engine (110). The stroke width engine (110) may be implemented in hardware (i.e., circuitry), software, or any combination thereof. The stroke width engine (110) may generate a SWT image (112) for the mask (106). Specifically, the stroke width engine (110) may apply a 4-way stroke width transform on the mask (106). The 4-way stroke estimate is the estimate of the stroke length in the horizontal direction, the vertical direction, the +45 degrees direction, and the −45 degrees direction. Those skilled in the art, having the benefit of this detailed description, will appreciate that the value of each pixel in the SWT image (112) may be referred to as a stroke width value and it represents the minimum pen width that could have created the corresponding pixel in the mask (106).

In one or more embodiments of the invention, the stroke width engine (110) calculates one or more stroke width parameters for the mask (106) based on the SWT image (112). Example stroke width parameters include the average (i.e., mean) stroke width value in the SWT image (112), the standard deviation of the stroke width values, the median stroke width value, etc. The stroke width parameters may be distributed to other components (e.g., filling engine (126)).

In one or more embodiments of the invention, the stroke width engine (110) calculates a stroke width estimate for each hole identified in the mask (106). The stroke width estimate is based on the stroke width values of the pixels in the SWT image (112) that surround the hole. For example, the stroke width estimate may be calculated as the average (i.e., mean) of the stroke width values of the pixels surrounding (i.e., on the perimeter of) the hole. Like the stroke width parameters, the stroke width estimate for each hole may be distributed to other components (e.g., filling engine (126)).

In one or more embodiments of the invention, the stroke width engine (110) generates an auxiliary mask (114) to calculate the stroke width estimate for a hole. The auxiliary mask (114) is a mask of the hole. In other words, pixels in the auxiliary mask (114) that correspond to the hole may be black, while all other pixels in the auxiliary mask (114) are white. Further, the auxiliary mask (114) may be dilated by a pixel to increase the size of the region in the auxiliary mask corresponding to the hole. An intersection operation may be performed between the auxiliary mask (114) and the SWT image (112) in order to obtain the stroke width values of the pixels in the SWT image (112) surrounding (i.e., on the perimeter of) the hole (discussed below).

In one or more embodiments of the invention, the system (100) includes the filling engine (126). The filling engine (126) may be implemented in hardware (i.e., circuitry), software, or any combination thereof. The filling engine (126) is configured to obtain or calculate a limit based on the stroke width parameters calculated from the SWT image (112). In one or more embodiments, the limit is a summation of a scaled version of the mean and a scaled version of the standard deviation: limit=k*(mean stroke width value in the SWT image)+j*(standard deviation). The scaling factors k and j may take on any value. For example, k=0.5 and j=0.73. In some embodiments, k and j may be equal. For example, k=j=0.73. The scaling factors may be set by a user or a manufacturer.

In one or more embodiments of the invention, the filling engine (126) is configured to compare the stroke width estimate for a hole with the calculated limit. If the stroke width estimate for the hole is less than the limit, the filling engine (126) removes the hole (i.e., fills the hole) in the mask (106). For example, if the hole is represented with white pixels, those pixels corresponding to the hole are set to black to match the rest of the connected component. A mask (106) with at least one hole removed (i.e., filled by the filling engine (126)) may be referred to as a revised mask.

Although FIG. 1 shows the system (100) as having four components (104, 110, 126, 132), in other embodiments, the system (100) may have more or fewer components. For example, the system (100) may include a scanner or a smart phone with a digital camera to capture the image of the writing board from which the mask (106) is generated. As another example, the system (100) may include additional engines to perform additional image processing (e.g., OCR) on the mask (106) to extract the contents (e.g., text characters) in the mask (106).

In one or more embodiments, the SWT image (112) and the stroke width parameters that are calculated based on the SWT image (112) may be updated after a hole in the mask has been filled by the filling engine (126). In other words, a revised SWT image may be generated based on the revised mask, and revised stroke width parameters may be calculated from the revised SWT image. These revised stroke width parameters are used to calculate the limit used by the filling engine (126) and the revised SWT is used to calculate estimated stroke widths for any remaining holes.

Figure 2:
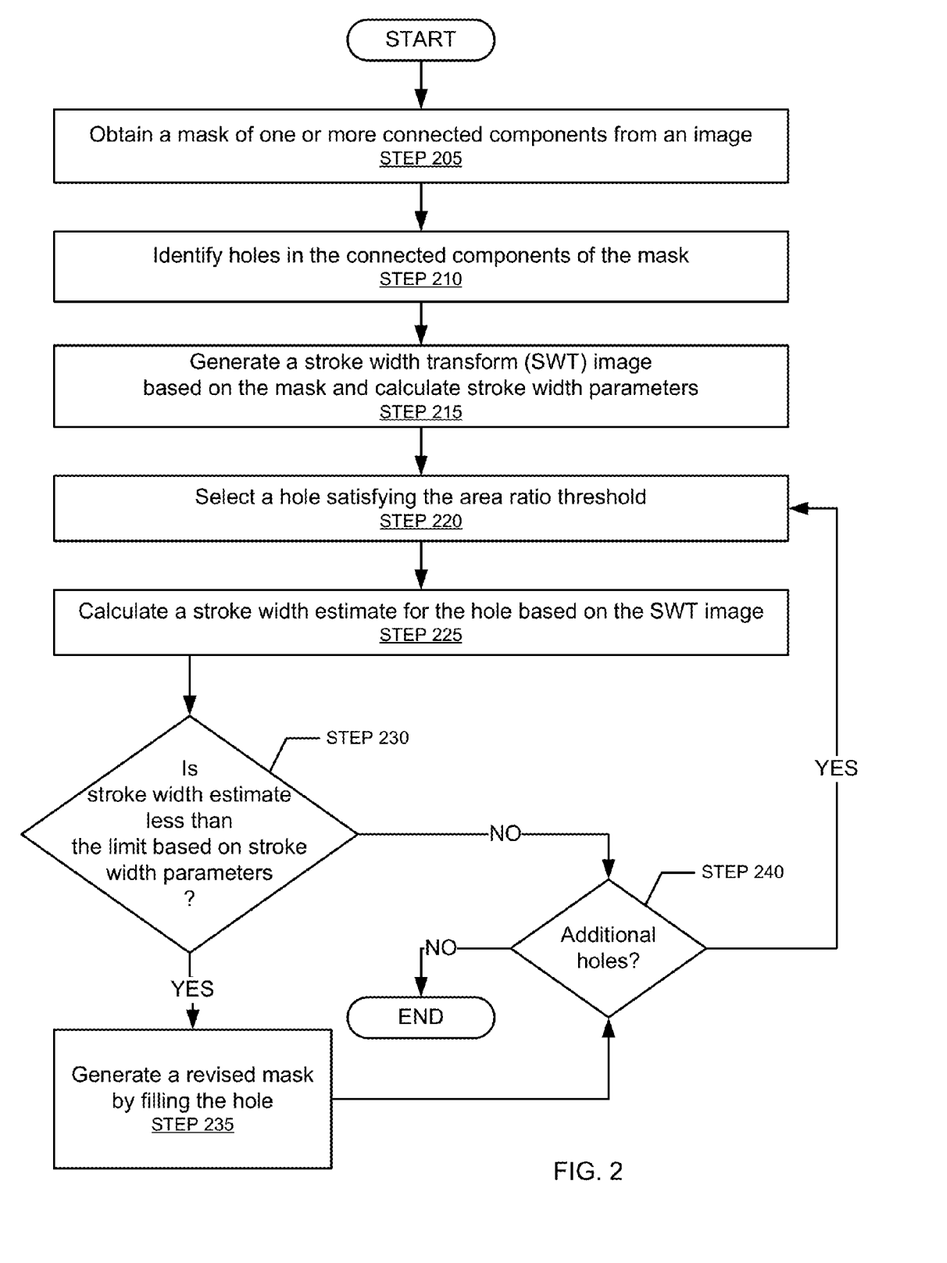
FIGS. 2 and 3 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (104, 110, 126, 132) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a mask of one or more connected components from an image is obtained (STEP 205). The mask may be of any size or format. The mask may correspond to the entire image or only a portion of the image. Each connected component may correspond to a continuous pen marking on a writing board within the image. Examples of connected components include the perimeter of a shape on the writing board, a portion of a text character on the writing board, an entire text character on the writing board, an entire word on the writing board, etc. Irregular sections of the connected components appear as holes in the mask.

In STEP 210, holes in one or more of the connected components of the mask are identified. In one or more embodiments, the holes are identified by applying one or more contour detection algorithms and/or edge detection algorithms to the mask. Additionally, the size in pixels of each hole and the size in pixels of each connected component may be determined from the mask.

In STEP 215, a SWT image is generated based on the mask. The SWT image may be generated by applying a 4-way stroke width transform on the mask to estimate the stroke length in the horizontal direction, the vertical direction, the +45 degrees direction, and the −45 degrees direction. Those skilled in the art, having the benefit of this detailed description, will appreciate that the value of each pixel in the SWT image may be referred to as a stroke width value and it represents the minimum pen width that could have created the corresponding pixel in the mask.

Still referring to STEP 215, one or more stroke width parameters may be calculated for the mask based on the SWT image. Example stroke width parameters include the average (i.e., mean) stroke width value in the SWT image, the standard deviation of the stroke width values, the median stroke width value, etc. In one or more embodiments, the edges of the SWT may be eroded before calculating the stroke width parameters.

In STEP 220, one of the identified holes satisfying (e.g., exceeding) the threshold area ratio is selected. As discussed above, for each hole, a ratio of the area of the hole to the area of the connected component in which the hole is located may be calculated. If the ratio exceeds a threshold area ratio (e.g., 0.1), the hole may be deemed essential to understanding the connected component and thus should not be removed. Accordingly, the hole selected in STEP 220 is a hole that is not essential to understanding the connected component, and thus is a candidate for removal.

In STEP 225, a stroke width estimate is calculated for the selected hole based on the SWT image. The stroke width estimate is based on the stroke width values of the pixels in the SWT image that surround the selected hole. For example, the stroke width estimate may be calculated as the average (i.e., mean) of the stroke width values of the pixels surrounding (i.e., on the perimeter of) the hole. STEP 225 is discussed in detailed with respect to FIG. 3.

In STEP 230, it is determined whether the stroke width estimate (from STEP 225) is less than a limit based on the stroke width parameters (e.g., mean and standard deviation from STEP 215). In other words, a comparison is generated between the stroke width estimate and the limit. In one or more embodiments of the invention, the limit is a summation of a scaled version of the mean and a scaled version of the standard deviation: limit=k*(mean stroke width value in the SWT image)+j*(standard deviation). The process proceeds to STEP 235 when it is determined that the stroke width estimate is less than the limit. The process proceeds to STEP 240 when it is determined that the stroke width estimate equals or exceeds the limit.

In STEP 235, a revised mask is generated by filling the selected hole (i.e., removing the selected hole). For example, if the hole is represented with white pixels, those pixels corresponding to the hole are set to black to match the rest of the connected component. In STEP 240, is it is determined whether additional holes that have not yet been selected exist. The process may return to STEP 220 when there are additional holes that are candidates for removal.

In one or more embodiments of the invention, a new SWT image may be generated based on the revised mask. For example, a new SWT may be generated every time a hole in the mask is filled. Additionally or alternatively, a new SWT may be generated when total area corresponding to the filled holes exceeds a filled holes threshold. For example, the filled holes threshold may be 5% of the area of the mask. As yet another example, the filled holes threshold may be 6.25% of the area of the mask occupied by connected connectors. The filled holes threshold may be set by a user or the manufacturer. Regardless of when a new SWT image is generated, new stroke width parameters are calculated based on the new SWT image. These new stroke width parameters are used to calculate a new limit (e.g., the limit in STEP 230). Moreover, the new SWT image is used to calculate stroke width estimates for the identified holes.

In one or more embodiments, following the process described in FIG. 2, the revised mask is in better condition for additional image processing. For example, it is more likely that OCR will correctly identify text characters from the revised mask than the originally obtained mask (i.e., the mask before any holes were filled).

Figure 3:
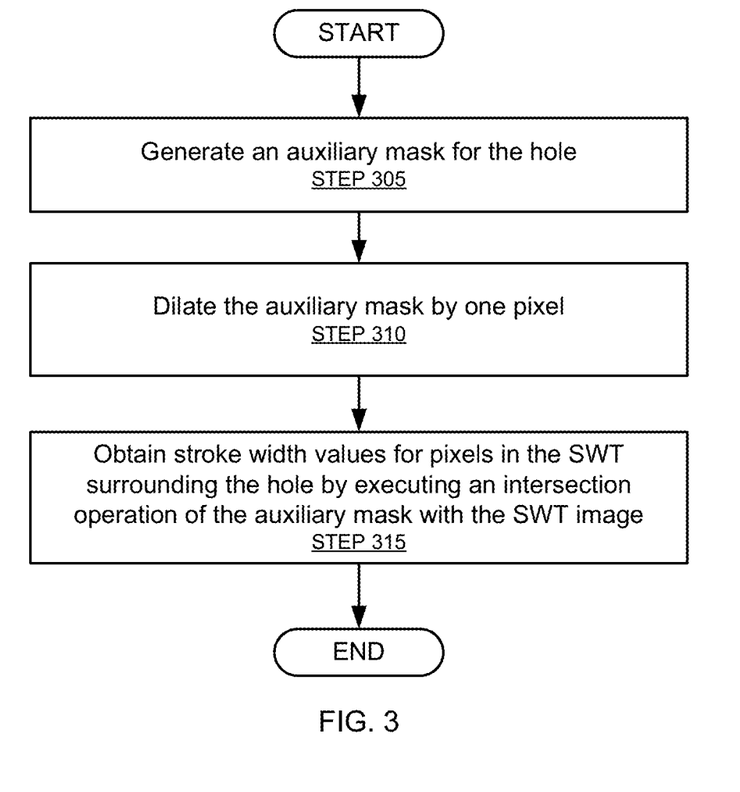

FIG. 3 shows a flowchart in accordance with one or more embodiments of the invention. The flowchart depicts a process for calculating a stroke width estimate for a hole. One or more of the steps in FIG. 3 may be performed by the stroke width engine (110), discussed above in reference to FIG. 1. Further, one or more of the steps in FIG. 3 may correspond to STEP 225 in FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, an auxiliary mask for the hole is generated (STEP 305). Pixels in the auxiliary mask that correspond to the hole may be black, while all other pixels in the auxiliary mask are white.

In STEP 310, the auxiliary mask is dilated by one pixel to increase the size of the region in the auxiliary mask corresponding to the hole. For example, if the hole in the mask was 3×3 pixels, following dilation, the region in the auxiliary mask corresponding to the hole is 5×5 pixels. Those skilled in the art, having the benefit of this detailed description, will appreciate that the dilate operation is an example of a morphological operation. The dilate operation applies a user specified structuring element to the auxiliary mask, creating the transformed mask of the same size.

In STEP 315, an intersection operation is executed between the auxiliary mask and the SWT image in order to obtain the stroke width values of the pixels in the SWT image surrounding (i.e., on the perimeter of) the hole. As discussed above, these stroke width values may be used to calculate the stroke width estimate for the hole. For example, the stroke width estimate for the hole may be the average of the obtained stroke width values.

Figure 4A:
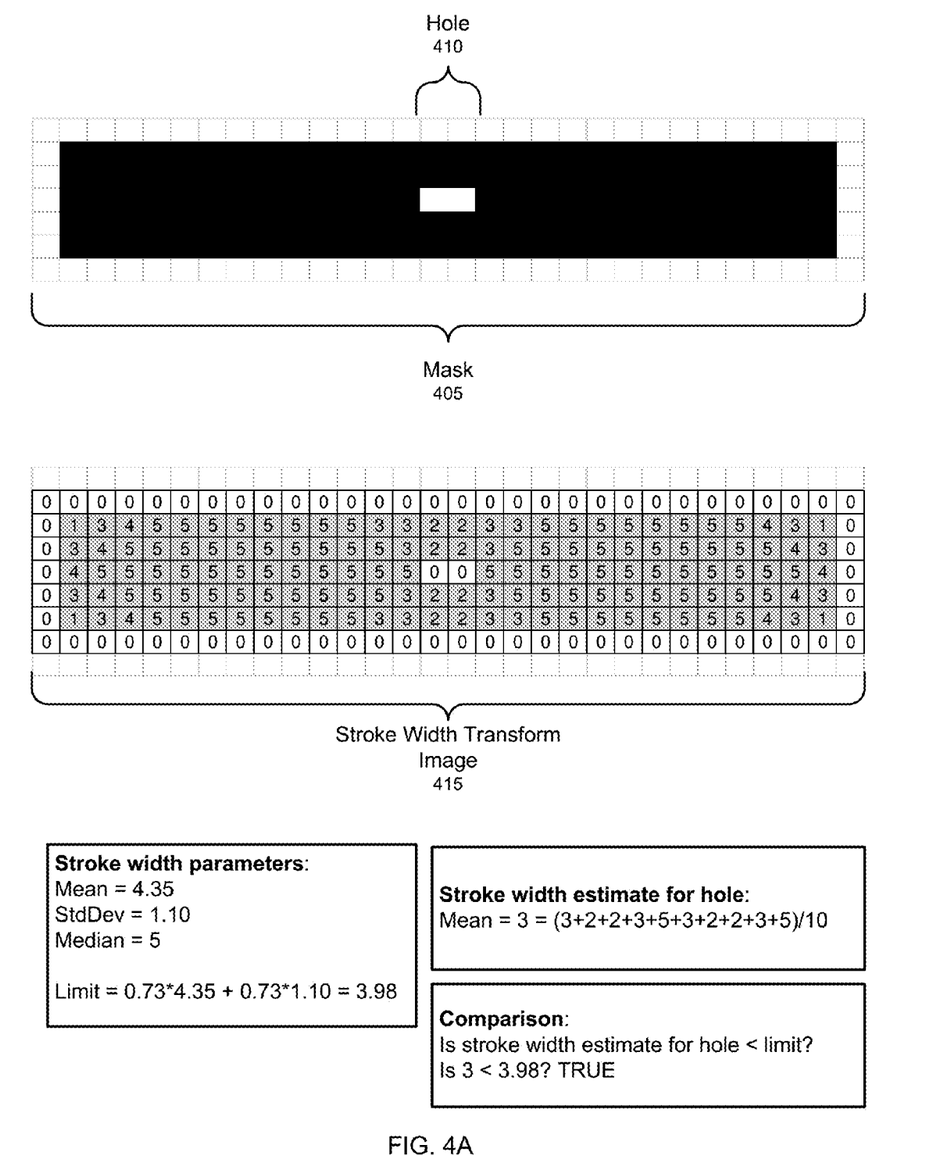
FIGS. 4A and 4B show an implementation example in accordance with one or more embodiments of the invention.
Figure 4B:
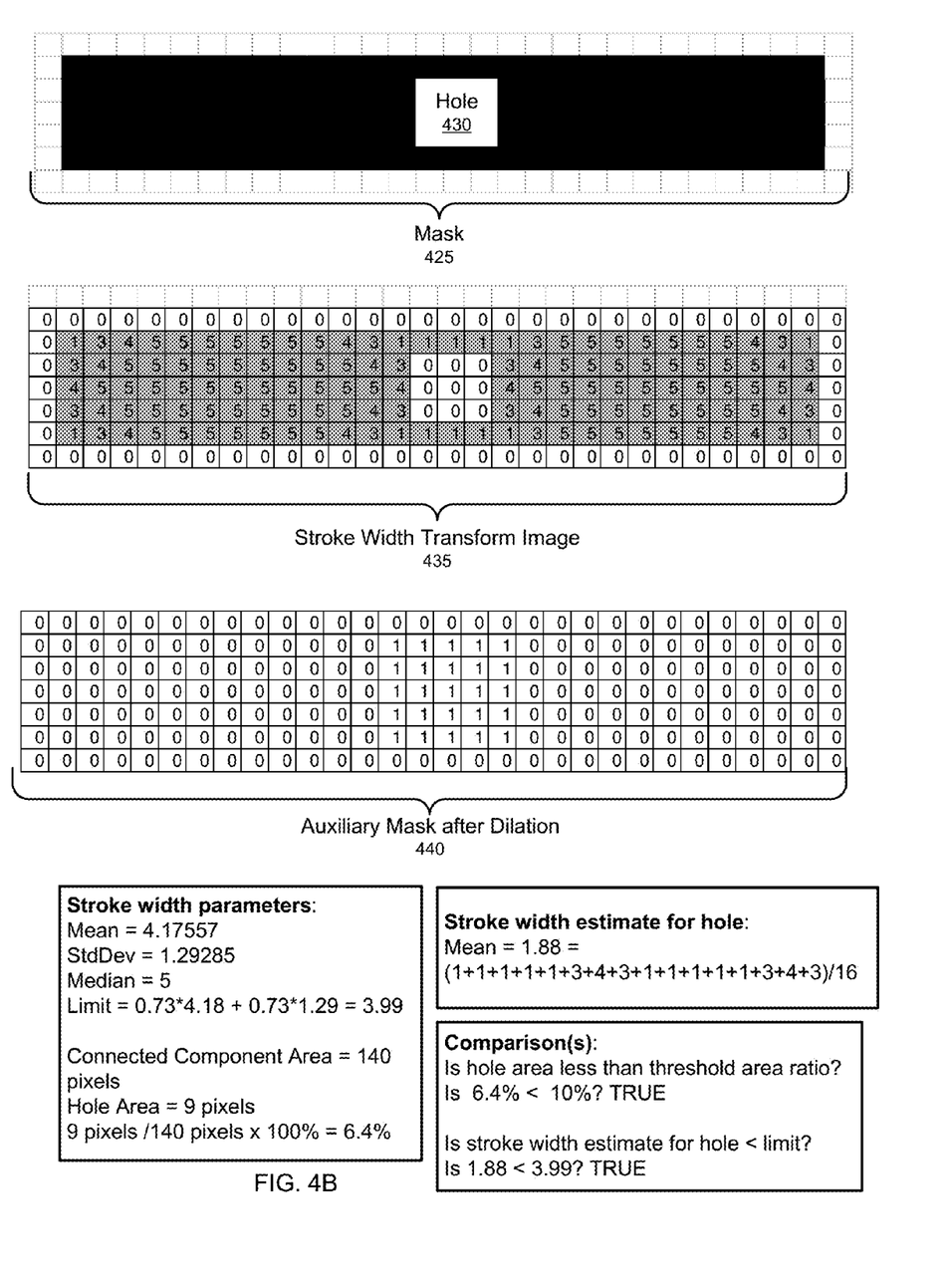

FIGS. 4A and 4B show an implementation example in accordance with one or more embodiments of the invention. As shown in FIG. 4A, there exists a mask (405) including a connected component from an image. A two-pixel hole (410) has been identified in the connected component of the mask (405). FIG. 4A also shows the SWT image (415) generated from the mask (405). The value of each pixel in the SWT image (415) may be referred to as a stroke width value and it represents the minimum pen width that could have created the corresponding pixel in the mask (405).

In the example of FIG. 4A, the mean stroke width value is 4.35 and the standard deviation is 1.10. Accordingly, the limit may be calculated as limit=k*(mean stroke width value in the SWT image)+j*(standard deviation). If k=j=0.73, the limit=3.98. The stroke width estimate for the hole (410) may be calculated as the as the average (i.e., mean) of the stroke width values of the pixels surrounding (i.e., on the perimeter of) the hole. In FIG. 4A, the stroke width estimate for the hole (410) is 3. As 3 is less than the limit of 3.98 (i.e., 3<3.987), the hole (410) is filled.

In the example of FIG. 4B, there exists a mask (425) including a connected component from an image. A 9-pixel hole (430) has been identified in the connected component of the mask (425). FIG. 4B also shows the SWT image (435) generated from the mask (425). The value of each pixel in the SWT image (435) may be referred to as a stroke width value and it represents the minimum pen width that could have created the corresponding pixel in the mask (425).

FIG. 4B also shows an auxiliary mask (440) for the hole (430). The auxiliary mask (440) is shown after dilation and thus the region corresponding to the hole (430) is larger than the hole itself (i.e., 5×5 pixels vs. 3×3 pixels). Those skilled in the art, having the benefit of this detailed description, will appreciate that an intersection of the stroke width transform image (435) and the auxiliary mask (440) is a mechanism for obtaining the stroke width values of the pixels of the SWT image (435) that are on the perimeter of the hole (430).

In the example of FIG. 4B, the area of the hole (430) is 9 pixels and the area of the connected connection in which the hole exists is 140 pixels. Accordingly, the ratio of the area of the hole (430) to the area of the connected component is 0.064 (or 6.4%). Assuming the threshold area ratio is 0.1 (or 10%), 0.064 is less than the threshold area ratio of 0.1 (i.e., 0.064<0.1), and thus the hole (430) is a candidate for removal.

In the example of FIG. 4B, the mean stroke width value is 4.17557 and the standard deviation is 1.29285. Accordingly, the limit may be calculated as limit=k*(mean stroke width value in the SWT image)+j*(standard deviation). If k=j=0.73, the limit=3.99. The stroke width estimate for the hole (430) may be calculated as the as the average (i.e., mean) of the stroke width values of the pixels surrounding (i.e., on the perimeter of) the hole, obtained using the auxiliary mask (440). In FIG. 4B, the stroke width estimate for the hole (410) is 1.88. As 1.88 is less than the limit of 3.99 (i.e., 1.88<3.99), the hole (430) is filled.

One or more embodiments of the invention may have the following advantages: the ability to identify and remove holes in connected components of a mask; the ability to generate SWT images to identify candidate holes for removal; the ability to generate auxiliary masks to obtain the stroke width values of pixels in the SWT images surrounding the holes; the ability to keep holes that are essential to the understanding of the connected component unfilled; the ability to exclude holes of certain sizes relative to the size of the connected component; the ability to update the SWT images and stroke width parameters as one or more holes are filled; the ability to improve the mask such that OCR and other image processing is likely to be more successful; etc.

Figure 5:
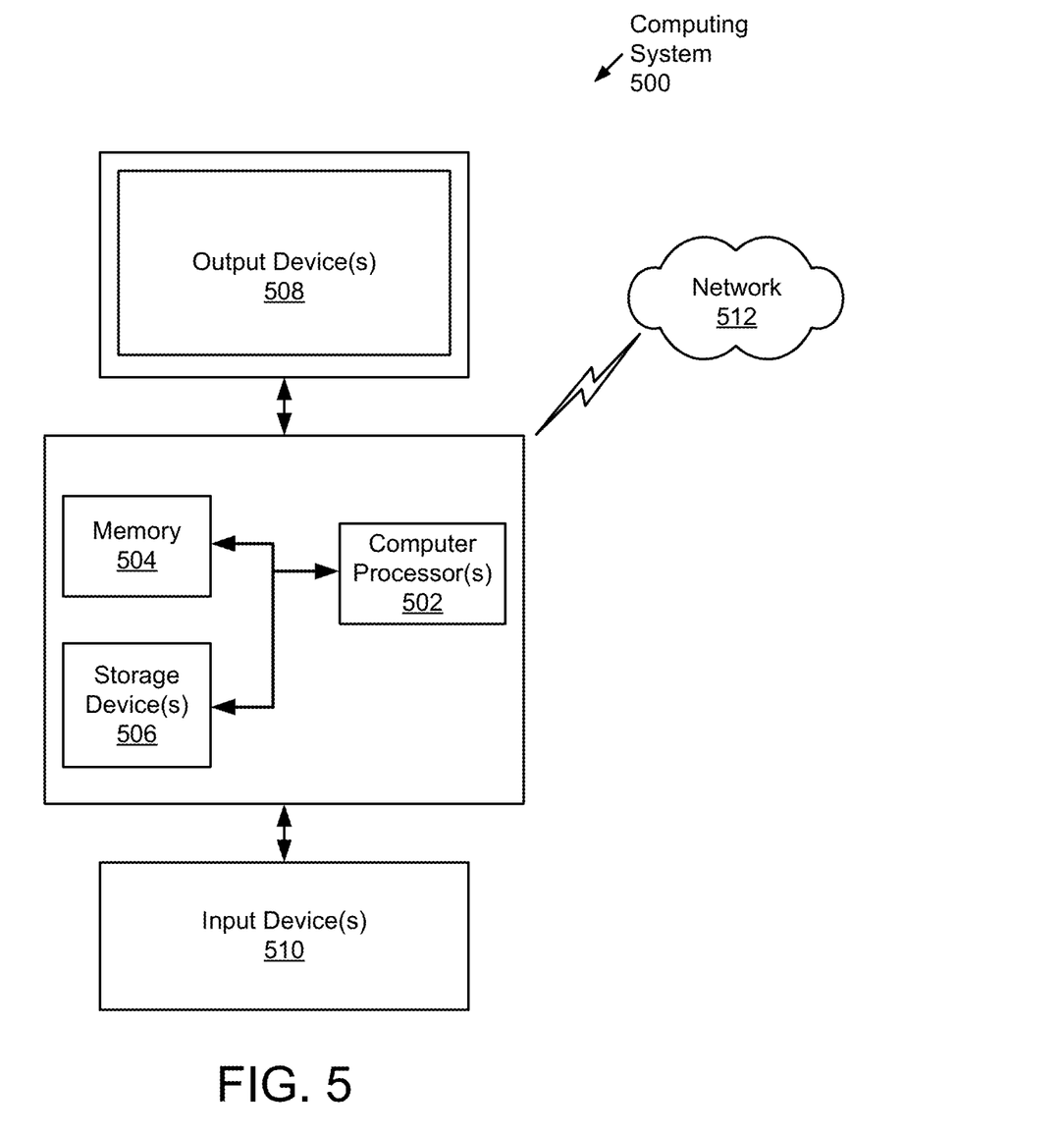
FIG. 5 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing using a computer processor, comprising:
   obtaining a mask of a connected component (CC) from an image;
   generating, by the computer processor, a first stroke width transform (SWT) image based on the mask;
   calculating a plurality of stroke width parameters for the mask based on the first SWT image;
   identifying a first hole in the CC of the mask;
   calculating a stroke width estimate for the first hole based on a plurality of stroke width values of a plurality of pixels in the first SWT image surrounding the first hole;
   generating a first comparison of the stroke width estimate for the first hole with a limit based on the plurality of stroke width parameters for the mask; and
   generating, by the computer processor, a revised mask by filling the first hole in response to the first comparison.

2. The method of claim 1, comprising:
   identifying second hole in the CC of the mask; and
   calculating a stroke width estimate for the second hole based on the first SWT image,
   wherein generating the revised mask further comprises filling the second hole in response to the stroke width estimate for the second hole being less than the limit.

3. The method of claim 1, comprising:
   identifying a second hole in the CC of the mask;
   generating a second SWT image based on the revised mask;
   calculating a plurality of stroke width parameters for the revised mask based on the second SWT image;
   calculating a stroke width estimate for the second hole based on the second SWT image;
   generating a second comparison of the stroke width estimate for the second hole with a limit based on the plurality of stroke width parameters for the revised mask; and
   filling the second hole in the revised mask in response to the second comparison.

4. The method of claim 3, wherein the second SWT is generated in response to an area of the filled holes exceeding a filled holes threshold.

5. The method of claim 1, wherein:
   the plurality of stroke width parameters comprises a mean stroke width and a standard deviation;
   the limit is a summation of a scaled version of the mean stroke width and a scaled version of the standard deviation; and
   the stroke width estimate for the first hole is a mean of the plurality of stroke width values of the plurality of pixels in the first SWT image surrounding the first hole.

6. The method of claim 5, wherein the scaled version and the mean stroke width are scaled by the same scaling factor of 0.73.

7. The method of claim 1, further comprising:
   identifying a second hole in the CC of the mask;
   calculating an area of the second hole;
   determining a ratio of the area of the second hole to an area of the CC exceeds a threshold area ratio; and
   keeping the second hole unfilled in response to the ratio exceeding the threshold area ratio.

8. The method of claim 1, further comprising:
   generating an auxiliary mask of the first hole;
   dilating the auxiliary mask by one pixel; and
   obtaining the plurality of stroke width values by executing an intersection operation of the auxiliary mask with the first SWT image after dilating the auxiliary mask.

9. The method of claim 1, further comprising:
   performing optical character recognition on the revised mask,
   wherein the CC corresponds to a hand-drawn stroke on a writing board in the image.

10. A non-transitory computer readable medium (CRM) storing computer readable program code embodied therein that, when executed by a computer processor:
    obtains a mask of a connected component (CC) from an image;
    generates a first stroke width transform (SWT) image based on the mask;
    calculates a plurality of stroke width parameters for the mask based on the first SWT image;
    identifies a first hole in the CC of the mask;
    calculates a stroke width estimate for the first hole based on a plurality of stroke width values of a plurality of pixels in the first SWT image surrounding the first hole;
    generates a first comparison of the stroke width estimate for the first hole with a limit based on the plurality of stroke width parameters for the mask; and
    generates a revised mask by filling the first hole in response to the first comparison.

11. The non-transitory CRM of claim 10, further storing computer readable program code embodied therein that, when executed by the computer processor:
    identifies second hole in the CC of the mask; and
    calculates a stroke width estimate for the second hole based on the first SWT image,
    wherein generating the revised mask further comprises filling the second hole in response to the stroke width estimate for the second hole being less than the limit.

12. The non-transitory CRM of claim 10, further storing computer readable program code embodied therein that, when executed by the computer processor:
    identifies a second hole in the CC of the mask;
    generates a second SWT image based on the revised mask;
    calculates a plurality of stroke width parameters for the revised mask based on the second SWT image;
    calculates a stroke width estimate for the second hole based on the second SWT image;
    generates a second comparison of the stroke width estimate for the second hole with a limit based on the plurality of stroke width parameters for the revised mask; and
    fills the second hole in the revised mask in response to the second comparison.

13. The non-transitory CRM of claim 10, wherein:
the plurality of stroke width parameters comprises a mean stroke width and a standard deviation;
the limit is a summation of a scaled version of the mean stroke width and a scaled version of the standard deviation; and
the stroke width estimate for the first hole is a mean of the plurality of stroke width values of the plurality of pixels in the first SWT image surrounding the first hole.

14. The non-transitory CRM of claim 10, further storing computer readable program code embodied therein that, when executed by the computer processor:
identifies a second hole in the CC of the mask;
calculates an area of the second hole;
determines a ratio of the area of the second hole to an area of the CC exceeds a threshold area ratio; and
keeps the second hole unfilled in response to the ratio exceeding the threshold area ratio.

15. The non-transitory CRM of claim 10, further storing computer readable program code embodied therein that, when executed by the computer processor:
generates an auxiliary mask of the first hole;
dilates the auxiliary mask by one pixel; and
obtains the plurality of stroke width values by executing an intersection operation of the auxiliary mask with the first SWT image after dilating the auxiliary mask.

16. A system for image processing, comprising:
a memory storing a mask of a connected component (CC) from an image; and
a computer processor connected to the memory that:
identifies a first hole in the CC of the mask;
generates a first stroke width transform (SWT) image based on the mask;
calculates a plurality of stroke width parameters for the mask based on the first SWT image;
calculates a stroke width estimate for the first hole based on a plurality of stroke width values of a plurality of pixels in the first SWT image surrounding the first hole;
generates a first comparison of the stroke width estimate for the first hole with a limit based on the plurality of stroke width parameters for the mask; and
generates a revised mask by filling the first hole in response to the first comparison.

17. The system of claim 16, wherein the computer processor also:
generates an auxiliary mask of the first hole;
dilates the auxiliary mask by one pixel; and
obtains the plurality of stroke width values by executing an intersection operation of the auxiliary mask with the first SWT image after dilating the auxiliary mask.

18. The system of claim 16, wherein the computer processor also:
identifies a second hole in the CC of the mask;
generates a second SWT image based on the revised mask;
calculates a plurality of stroke width parameters for the revised mask based on the second SWT image;
calculates a stroke width estimate for the second hole based on the second SWT image; and
generates a second comparison of the stroke width estimate for the second hole with a limit based on the plurality of stroke width parameters for the revised mask; and
fills the second hole in the revised mask in response to the second comparison.

19. The system of claim 16, wherein the computer processor also:
identifies a second hole in the CC of the mask;
calculates an area of the second hole;
determines a ratio of the area of the second hole to an area of the CC exceeds a threshold area ratio; and
keeps the second hole unfilled in response to the ratio exceeding the threshold area ratio.

20. The system of claim 16, wherein the CC corresponds to a hand-drawn stroke on a writing board in the image, and wherein optical character recognition is performed on the revised mask.

* * * * *